Figure 1:
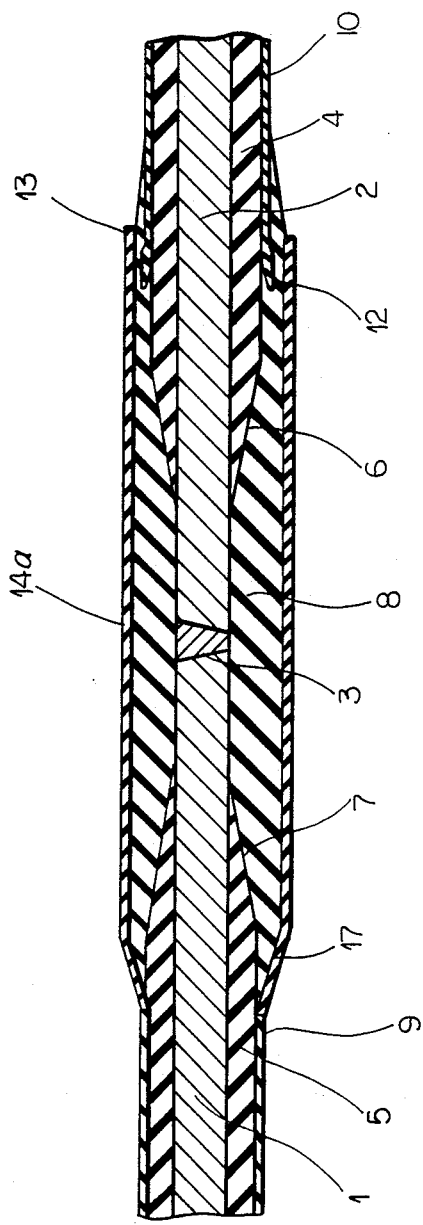

United States Patent [19]

Nielsen

[11] Patent Number: 4,828,634
[45] Date of Patent: May 9, 1989

[54] METHOD OF RE-ESTABLISHING SEMI-CONDUCTING LAYERS AROUND A CABLE SPLICE, AND A SLEEVE FOR USE IN THE PERFORMANCE OF THE METHOD

[75] Inventor: Ole K. Nielsen, Køge, Denmark

[73] Assignee: Akieselskabet Nordiske Kabel - og Traadfabriker, Frederiksberg, Denmark

[21] Appl. No.: 141,606

[22] PCT Filed: May 6, 1987

[86] PCT No.: PCT/DK87/00051
§ 371 Date: Dec. 30, 1987
§ 102(e) Date: Dec. 30, 1987

[87] PCT Pub. No.: WO87/07095
PCT Pub. Date: Nov. 19, 1987

[30] Foreign Application Priority Data

May 7, 1986 [DK] Denmark ............................ 2109/86

[51] Int. Cl.⁴ .......................................... H01B 13/06
[52] U.S. Cl. .......................... 156/49; 156/52; 156/86; 174/36; 174/85; 174/DIG. 8; 428/36.91; 428/913; 174/73.1

[58] Field of Search ..................... 156/49, 52, 53, 86; 174/36, 73 R, 85, DIG. 8; 428/36, 913

[56] References Cited

U.S. PATENT DOCUMENTS 3,127,291  3/1964  Betz .................................. 156/49
4,164,620  8/1979  Hervig ............................. 174/73 R
4,234,755  11/1980 Simons ............................. 174/19
4,479,031  10/1984 Ishise .............................. 174/73 R

FOREIGN PATENT DOCUMENTS 0088450  9/1983  European Pat. Off. .

Primary Examiner—Robert A. Dawson
Attorney, Agent, or Firm—Ladas & Parry

[57] ABSTRACT

A method of re-establishing mutually insulated semi-conducting layers (9, 10) around respective ones of a pair of spliced electric cables, which is characterized in that the semi-conducting layer of at least one cable is terminated with a stable cable insulation (4) as a base. A sleeve (12) for use in the performance of this method consists of a material relatively stable against heat action an comprises a cylinder-shaped part (15) with a predetermined inside diameter as well as a hopper-shaped part.

6 Claims, 2 Drawing Sheets

METHOD OF RE-ESTABLISHING SEMI-CONDUCTING LAYERS AROUND A CABLE SPLICE, AND A SLEEVE FOR USE IN THE PERFORMANCE OF THE METHOD

The invention concerns a method of re-establishing mutually insulated semi-conducting layers around respective ones of a pair of spliced electric cables in connection with insulating the spliced cables.

A known shield for a high-voltage cable comprises an electrically conducting part disposed around an electrically semi-conducting part which serves to ensure as even a distribution of the electric field as possible, while the electrically conducting part carries the capacitive currents and fault currents. In connection with so-called crossbond cable systems where the shield conductors are crossbonded to reduce shield currents, it is necessary to puncture the shield of each cable at suitable intervals, preferably in connection with splicing of the cable.

Shield puncture, as mentioned above, can very easily result in field concentrations which may cause breakdown, and it is therefore very important to avoid such field concentrations. For example the EP No. B1 88450 discloses a procedure for re-establishing the insulation of the cable and the semi-conducting layers of the cable, so that the semi-conducting layers are mutually insulated. However, the risk of electrical breakdown in this and related methods has been undesirably great even though the rather laborious splicing operation has been performed with very great care.

The object of the invention is to provide a method of re-establishing the semi-conducting layers, as explained above, and where the risk of electric breakdown in the re-established area is reduced.

This object is achieved in that the semi-conducting layers of one cable are terminated with the stable cable insulation as a base. Then, the cable joint and the semi-conductor termination may be surrounded in a manner known per se by a cross-linkable material and be subjected to such heat and pressure conditions that the insulation of the cable joint and the mutual insulation between the semi-conducting layers are crossbonded and at the same time cause bonding between the incorporated components.

The invention is based on the finding that the breakdown phenomena are caused by the fact that the re-established semi-conducting layers differ noticeably from an ideal geometrical shape, when the layers have been established on top of a layer of an insulation material which becomes partly liquid in a subsequent heat treatment. It is common—see e.g. the above-mentioned EP patent specification—to re-establish the insulation of the cable around the splice by winding vulcanizable polyethylene tape, which can be crossbonded in the heat treatment, around the splice. When the area where the semi-conducting shields are mutually insulated is placed outside the splice area portion which comprises a thick layer of polyethylene tape, a very stable base is obtained precisely for the critical part of the re-established, semi-conducting layers. This method can even be performed in a single operation and without strict tolerance requirements as to the execution of the job.

The method of the invention might be carried out by winding semi-conducting tape around the insulation, or by pulling back the semi-conducting layer, but, preferably, the method is carried out using a sleeve, which provides a very great stability in shape, since at least one of the semi-conducting layers is terminated by means of a relatively rigid, semi-conducting sleeve, whose inside diameter is only slightly greater than the outside diameter of the cable insulation. It may occur in practice that quite a few layers of vulcanizable tape are wound around the cable insulation, and precisely because of the axial extent and rigidity of the sleeve, the softening of the tape during the heat treatment has in practice no influence on a well-defined positioning of the sleeve. After re-establishment, the semi-conducting layer of the other cable end extends over the insulation establishment area and past the outer rim of the sleeve, so that the rigidity of the rim also contributes to the positioning of the latter semi-conducting layer, even though there may be material between said layer and the sleeve that will be softened by the heat treatment.

The invention also concerns a sleeve for use in the performance of the latter method. The sleeve is characterized by a heat-stable beaded-cylinder structure and, preferably, has a hopper-shaped opening with an opening angle that corresponds to the shape of the re-established semi-conducting layer on the other cable end.

Figure 2:
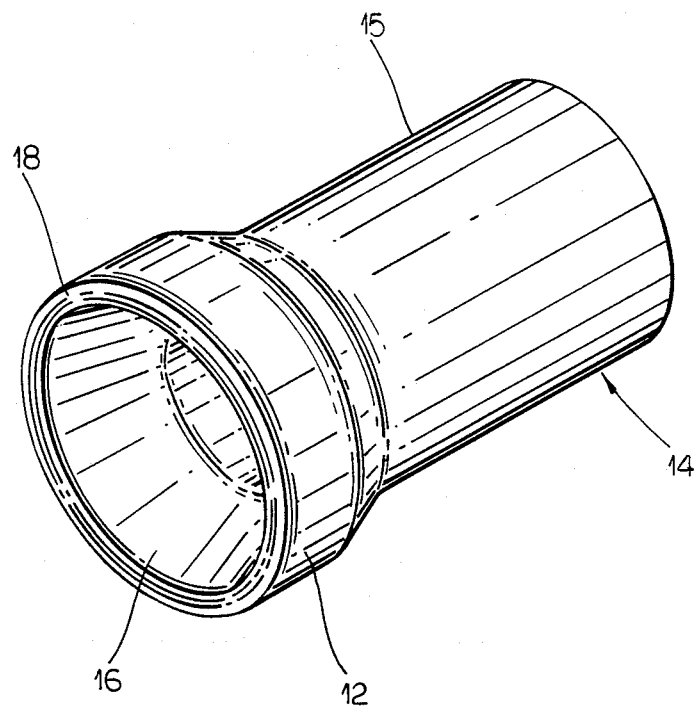

The invention will be explained more fully by the following description of a preferred embodiment with reference to the drawing, in which FIG. 1 schematically shows longitudinal cross section of a cable splice, and FIG. 2 shows an embodiment of a sleeve according to the invention.

FIG. 1 shows the cable splice parts relevant for explaining the invention, said parts comprising a pair of electric conductors 1, 2 which are interconnected, e.g. by a weld 3.

The electric conductors are surrounded by respective insulation layers 4, 5, end portions of which have been removed prior to splicing the ends of the conductors together, as shown by tapers 6, 7. After the conductor splicing, insulation 8 is about the spliced conductor ends re-established, preferably by winding vulcanizable polyethylene tape around the splice, said tape being then heat-treated for crossbonding the material and fusing it with the original insulation along the end tapers 6, 7.

The semi-conducting layers 9, 10 are disposed around the insulation 4, 5, and these were re-established in the past by, prior to the heat-treatment of the vulcanizable tape, winding a vulcanizable, semi-conducting tape around said tape so that the area where the two semi-conducting layers are mutually insulated would be positioned above the insulation 8 not yet vulcanized. However, after the vulcanization process it has been found that the mutual position and geometry of the semi-conducting layers differ so much from the ideal shape that the risk of electric breakdown increases significantly, and, on the basis of this finding, the critical area of the semi-conducting layers are moved, according to the invention, to engage the original insulation, which is crossbonded and is stable against the heat action. This is shown clearly in FIG. 1, where the semiconducting layer 10 of one cable 2 is terminated at 12, while the semi-conducting layer 9 of the other cable 1 is extended by corresponding semiconductor element 14a in over the insulation 8 and terminated at 13. The space between the terminations 12 and 13 to typically filled with of vulcanizable, electrically insulating tape of overall thickness just to withstand the voltage differences of fault currents in the insulation shield 4, 5, 8. It will thus be appreciated that the process of the invention provides for a considerably more stable area where the semi-conducting layers are separated, than was possible in the past. The termination 12 might be provided with a rounded edge by winding vulcanizable semi-conducting tape around the insulation 4, or by pulling back the semi-conducting layer 10, but to increase the stability of the critical area additionally, the process is preferably performed by using the sleeve 14 shown in FIG. 2 for the extending semiconductor layer 14a.

The sleeve 14 comprises an annular bead 12 on one end of a cylindrical part 15. The inside diameter of the sleeve is only slightly greater than the outside diameter of the cable insulation 4, 5, so that the sleeve may be pulled in over the cable insulation, which may optionally be provided with one or two layers of tape. The bead 12 has an internal conical i.e. hopper-shaped surface 16, the opening angle of which preferably corresponds to the shape of the semi-conducting layer 9, as shown at 17. Further, the rim 18 of the bead 12 is rounded so that the electric lines of force do not exhibit greater concentrations at the transition between the semi-conducting terminations 12 and 13. The conical surface moreover contributes to an expedient field line course, and it will be appreciated that the vulcanizable tape is to wound into a cone shape which can be received by the hopper-shaped opening of the bead 12. Of course, this part of the tape will also become liquid during the vulcanization process, but owing to the relatively great rigidity of the bead 12 and because the sleeve as a whole is guided accurately by the cylindrical part 15, an excellent transition from one semi-conducting layer 10 to the other semi-conducting layer 9 will be obtained also after the heat treatment.

With reference to FIG. 1, it will be appreciated that the area 13 might alternatively be disposed so as to be the innermost area, while the area 12 will be the outermost area, i.e. the rim of the sleeve has a greater diameter for surrounding the semi-conducting layer which connects with the layer 9.

I claim:

1. A method of re-establishing mutually insulated semiconducting layers around their respective ones of a pair of spliced electric cables in connection with re-establishment of a cable insulation between the central electric conductor and the semi-conducting layers, characterized by terminating and re-establishing the semi-conducting layer of one cable with the original cable insulation as a base and integrating the re-established semi-conducting layers and said insulation by thermal treatment.

2. A method according to claim 1, characterized by using a sleeve of a semi-conducting material relatively stable against heat action, said sleeve being connected with the semi-conducting layer of said one cable and forming a loose fit around the insulation of the cable.

3. A sleeve of semi-conducting material for use in the performance of the method according to claim 2, characterized in that it consists of a material relatively stable against heat action and comprises a cylinder-shaped part with a predetermined inside diameter, a bead with an evenly rounded edge being provided along one rim of said sleeve.

4. A sleeve according to claim 3, characterized in that the internal wall of the bead comprises a hopper-shaped part whose axial length is smaller than the axial length of the bead.

5. A method of insulating spliced cables, comprising:
providing a pair of cables having electric conductors respectively spliced to each other at ends thereof, first insulation layers about the conductors except at the splice therebetween, and first semi-conducting layers about the first insulation layers and having terminations thereon at the splice;
providing a second insulation layer about the spliced ends of the cables and extending between the first insulation layers thereabout, the second insulation layer also extending about the termination of the first semi-conducting layer of one of the cables;
providing a second semi-conducting layer about the second insulation layer and extending from a first termination at the termination of the first semi-conducting layer of the other of the cables to a second termination on the second insulation layer proximate the termination of the first semi-conducting layer of the one cable; and
integrating the first termination of the second semi-conducting layer and the termination of the first semi-conducting layer of the other of the cables thereat.

6. Insulated spliced cables, comprising:
a pair of cables having electric conductors respectively spliced to each other at ends thereof, first insulation layers about the conductors except at the splice therebetween, and first semi-conducting layers about the first insulation layers and having terminations thereon at the splice;
a second insulation layer about the spliced ends of the cables and extending between the first insulation layers thereabout, the second insulation layer also extending about the termination of the first semi-conducting layer of one of the cables;
providing a second semi-conducting layer about the second insulation layer and extending from a first termination at the termination of the first semi-conducting layer of the other of the cables to a second termination on the second insulation layer proximate the termination of the first semi-conducting layer of the one cable; and
integrating means for integrating the first termination of the second semi-conducting layer and the termination of the first semi-conducting layer of the other of the cables thereat.

* * * * *